United States Patent
Hunt et al.

(10) Patent No.: US 9,853,933 B2
(45) Date of Patent: Dec. 26, 2017

(54) MESSAGE QUEUE REPLICATION WITH MESSAGE OWNERSHIP MIGRATION

(71) Applicant: 60East Technologies, Inc., Las Vegas, NV (US)

(72) Inventors: Brand Hunt, Las Vegas, NV (US); David Noor, Redmond, WA (US); Jeffrey M. Birnbaum, New York, NY (US)

(73) Assignee: 60East Technologies, Inc., Las Vegas, NV (US)

( * ) Notice: Subject to any disclaimer, the term of this patent is extended or adjusted under 35 U.S.C. 154(b) by 210 days.

(21) Appl. No.: 14/825,349

(22) Filed: Aug. 13, 2015

(65) Prior Publication Data

US 2017/0048169 A1 Feb. 16, 2017

(51) Int. Cl.
*G06F 15/16* (2006.01)
*H04L 12/58* (2006.01)

(52) U.S. Cl.
CPC .................................. *H04L 51/30* (2013.01)

(58) Field of Classification Search
CPC .............................. H04L 51/043; H04L 51/30
See application file for complete search history.

(56) References Cited

U.S. PATENT DOCUMENTS

| | | | |
|---|---|---|---|
| 6,826,182 B1 * | 11/2004 | Parthasarathy | ..... H04L 12/1877 370/390 |
| 7,680,793 B2 | 3/2010 | Wong et al. | |
| 8,301,595 B2 | 10/2012 | Megginson | |
| 8,336,057 B2 | 12/2012 | Shirgaonkar | |
| 8,370,395 B1 | 2/2013 | Gupta et al. | |

(Continued)

OTHER PUBLICATIONS

Publish-subscribe pattern, https://en.wikipedia.org/wiki/Publish%E2%80%93subscribe_pattern, printed Jul. 8, 2015.

(Continued)

*Primary Examiner* — Cheikh Ndiaye
(74) *Attorney, Agent, or Firm* — Bryan Cave LLP

(57) ABSTRACT

The method including receiving, at a first node of a plurality of computing nodes, a message ownership migration request for a first message. The message ownership migration request can originate from a second node of the plurality of computing nodes. The first node can be an owner of the first message in a first instance of a message queue at the first node. The first message can be published from a first publisher to the message queue at one of the nodes of the plurality of computing nodes. The first message in the first instance of the message queue at the first node can be replicated at a second instance of the message queue at the second node. A first subscriber can be subscribed to the second instance of the message queue at the second node. The method also can include designating the second node as a new owner of the first message such that the first node is no longer the owner of the first message. The method further can include sending a message ownership migration notification for the first message from the first node to each of the other nodes of the plurality of computing nodes. The message ownership migration notification can identify the second node as the new owner of the first message. Other embodiments are provided.

20 Claims, 12 Drawing Sheets

(56) References Cited

U.S. PATENT DOCUMENTS

| | | | |
|---|---|---|---|
| 8,595,380 | B2 | 11/2013 | Megginson |
| 8,627,333 | B2 | 1/2014 | Chen et al. |
| 9,244,996 | B2* | 1/2016 | Bourbonnais ..... G06F 17/30578 |
| 9,319,267 | B1* | 4/2016 | Buchko .............. H04L 41/0663 |
| 9,647,972 | B2* | 5/2017 | Banks |
| 2003/0182464 | A1* | 9/2003 | Hamilton ................ G06F 9/546 719/314 |
| 2011/0307443 | A1* | 12/2011 | Megginson ....... G06F 17/30578 707/622 |
| 2012/0066616 | A1 | 3/2012 | Woods et al. |
| 2014/0372702 | A1* | 12/2014 | Subramanyam .... G06F 12/0848 711/129 |

OTHER PUBLICATIONS

Message queue, https://en.wikipedia.org/wiki/Message_queue, printed Jul. 6, 2015.
Message oriented middleware, https://en.wikipedia.org/wiki/Message_oriented_middleware, printed Jul. 8, 2015.
Messaging pattern, https://en.wikipedia.org/wiki/Messaging_pattern, printed Jul. 8, 2015.
Message Queuing (MSMQ), https://msdn.microsoft.com/en-us/library/ms711472(v=vs.85).aspx, printed Jul. 6, 2015.
IBM WebSphere MQ, https://en.wikipedia.org/wiki/IBM_WebSphere_MQ, printed Jul. 6, 2015.
HornetQ, https://en.wikipedia.org/wiki/HornetQ, printed Jul. 6, 2015.
Advanced Message Queuing Protocol, https://en.wikipedia.org/wiki/Advanced_Message_Queuing_Protocol, printed Jul. 6, 2015.
Amazon Simple Queue Service, https://en.wikipedia.org/wiki/Amazon_Simple_Queue_Service, printed Jul. 6, 2015.
Kestrel, http://twitter.github.io/kestrel/, printed Jul. 6, 2015.
Redis, https://en.wikipedia.org/wiki/Redis, printed Jul. 6, 2015.
RabbitMQ, https://en.wikipedia.org/wiki/RabbitMQ, printed Jul. 6, 2015.
"Evaluating persistent, replicated message queues (updated w/ Kafka)," Blog of Adam Warski, http://www.warski.org/blog/, Jul. 1, 2014.
"Suggestions on pub/sub architecture with high availability," Stack Exchange, http://stackoverflow.com/questions/17077253/suggestions-on-pub-sub-architecture-with-high-availability, Jun. 13, 2013.
"Active/passive clustering," IBM Knowledge Center, https://www-01.ibm.com/support/knowledgecenter/OMXEMES710/com.ibm.omegamon.mes_doc_7.1/c-hacmp_kqi_ap_cluster.html, printed Jul. 6, 2015.
"How to configure RabbitMQ using Active/Passive High Availability architecture," Stack Exchange, http://stackoverflow.com/questions/20501430/how-to-configure-rabbitmq-using-active-passive-high-availability-architecture, Dec. 13, 2013.
"Partitioning Messaging Entities," https://msdn.microsoft.com/en-us/library/azure/dn520246.aspx, Apr. 27, 2015.
"Highly Available Queues," RabbitMQ, http://www.rabbitmq.com/ha.html, printed Jul. 6, 2015.
"Clustering Guide," RabbitMQ, http://www.rabbitmq.com/clustering.html, printed Jul. 6, 2015.
"Putting the buzz in messaging," HornetQ User Manual, http://docs.jboss.org/hornetq/2.4.0.Final/docs/user-manual/html_single/index.html#d0e11342, printed Jul. 6, 2015.

* cited by examiner

MESSAGE QUEUE REPLICATION WITH MESSAGE OWNERSHIP MIGRATION

TECHNICAL FIELD

This disclosure relates generally to messaging infrastructures between distributed computing systems, and relates more particularly to providing replication for message queuing.

BACKGROUND

Message processing systems generally route messages from publishers to subscribers. In conventional publisher-subscriber systems, publishers send messages through a message processing system without necessarily knowing all of the subscribers that will receive the messages, and the messages are routed to one or more of the subscribers based on topics of the messages and/or content within the messages to which the one or more subscribers have subscribed. Message queuing, by contrast, typically provides each message to a single subscriber. Replication across multiple nodes of a message processing system can provide high availability of message queuing between publishers and subscribers.

BRIEF DESCRIPTION OF THE DRAWINGS

To facilitate further description of the embodiments, the following drawings are provided in which.

Figure 1:
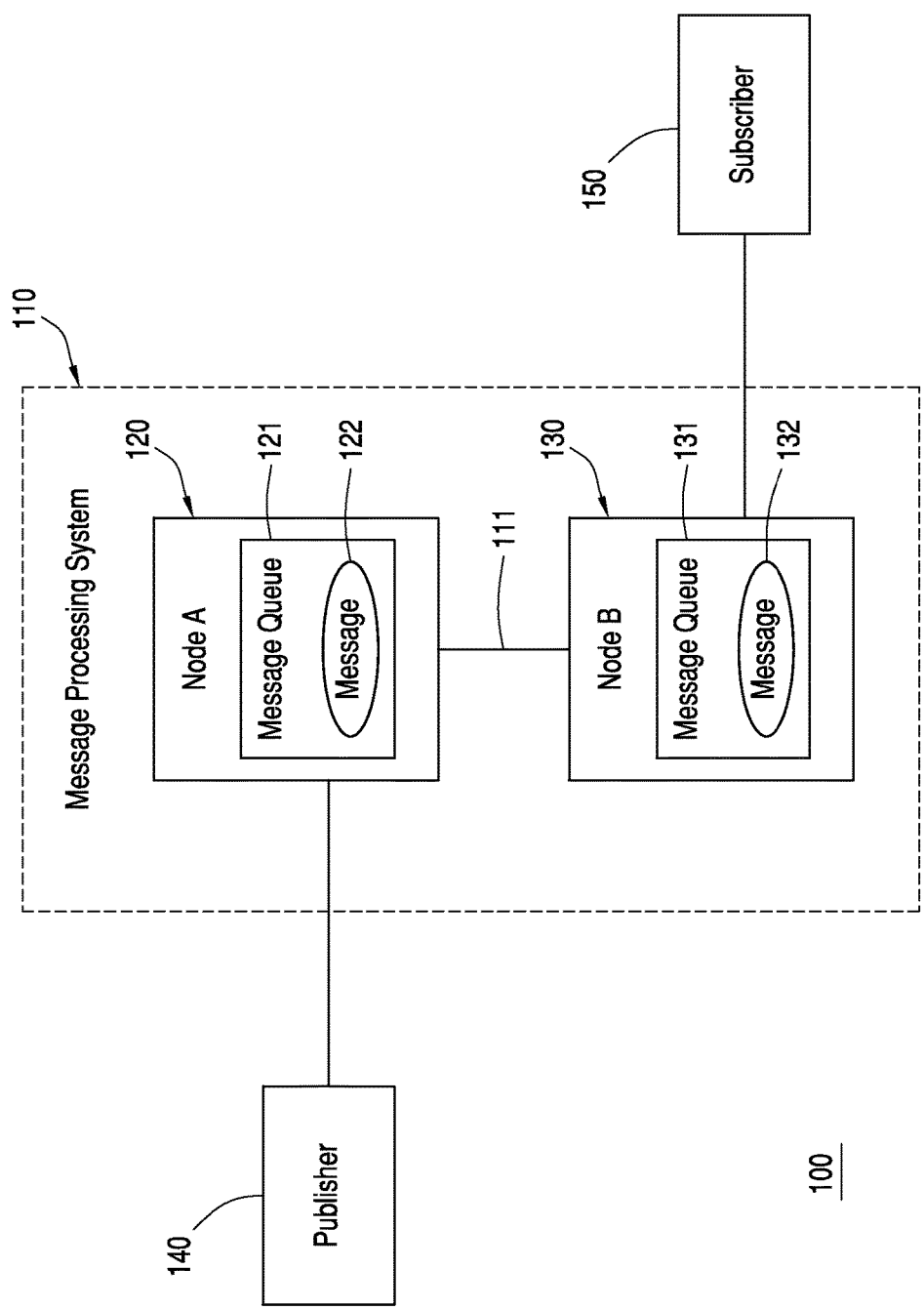
FIG. 1 illustrates a block diagram of a system, which can be employed to provide replication in message queuing, according to an embodiment.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Various embodiments include a system. The system can include a plurality of computing nodes each comprising one or more processing modules and one or more non-transitory storage modules storing computing instructions configured to run on the one or more processing modules. The system also can include a first node of the plurality of computing nodes, the first node comprising a first instance of a message queue. The system additionally can include a second node of the plurality of computing nodes, the second node comprising a second instance of the message queue. The computing instructions of the first node can be configured, when run on the one or more processing modules of the first node, to perform various acts. The acts can include receiving a message ownership migration request for a first message. The message ownership migration request can originate from the second node of the plurality of computing nodes. The first node can be an owner of the first message in the first instance of the message queue at the first node. The first message can be published from a first publisher to the message queue at one of the nodes of the plurality of computing nodes. The first message in the first instance of the message queue at the first node can be replicated at the second instance of the message queue at the second node. A first subscriber being subscribed to the second instance of the message queue at the second node. The acts also can include designating the second node as a new owner of the first message such that the first node is no longer the owner of the first message. The acts further can include sending a message ownership migration notification for the first message from the first node to each of the other nodes of the plurality of computing nodes. The message ownership migration notification can identify the second node as the new owner of the first message.

A number of embodiments include a method. The method can include receiving, at a first node of a plurality of computing nodes, a message ownership migration request for a first message. The message ownership migration request can originate from a second node of the plurality of computing nodes. The first node can be an owner of the first message in a first instance of a message queue at the first node. The first message can be published from a first publisher to the message queue at one of the nodes of the plurality of computing nodes. The first message in the first instance of the message queue at the first node can be replicated at a second instance of the message queue at the second node. A first subscriber can be subscribed to the second instance of the message queue at the second node. The method also can include designating the second node as a new owner of the first message such that the first node is no longer the owner of the first message. The method further can include sending a message ownership migration notification for the first message from the first node to each of the other nodes of the plurality of computing nodes. The message ownership migration notification can identify the second node as the new owner of the first message.

Replication across multiple nodes of a message processing system can provide high availability of message queuing between publishers and subscribers. In some conventional systems, replication across multiple nodes of a message processing system can be performed by using a partitioning key for the messages, which assigns the messages to particular nodes of the message processing system. For example, if there are three nodes, A, B, and C of a message processing system, only a subscriber on B can see certain messages. In a number of conventional implementations, the messages can be delivered in a "round robin" manner to various subscribers on different nodes, such that if a subscriber wants to see all of the messages, the subscriber needs to subscribe to each node, which can violate message queuing principles of subscribers subscribing to only one node, and can violate message queuing principles of first in, first out. In several conventional implementations, if a node fails in a partitioning key approach, the nodes needs to be restructured.

In other conventional replication approaches, the message processing system can include an active node and one or more passive nodes. The passive nodes can receive a replication of all messages, but subscribers generally do not subscribe to the passive nodes, except for failover purposes. In an active-passive replication approach, failover generally involves a number of complications. Further, in an active-passive replication approach, the passive nodes are generally wasted resources, as they are generally on standby and not used for message delivery. Conventional replication approaches for message queuing often can involve problems with message ordering and/or duplicate message delivery, and/or can impose distributed computing burdens on subscribers.

Turning to the drawings, FIG. 1 illustrates a block diagram of a system 100, which can be employed to provide replication in message queuing, according to an embodiment. System 100 is merely exemplary and embodiments of the system are not limited to the embodiments presented herein. The system can be employed in many different embodiments or examples not specifically depicted or described herein. In some embodiments, certain elements or modules of system 100 can perform various procedures, processes, and/or activities. In other embodiments, the procedures, processes, and/or activities can be performed by other suitable elements or modules of system 100.

Figure 11:
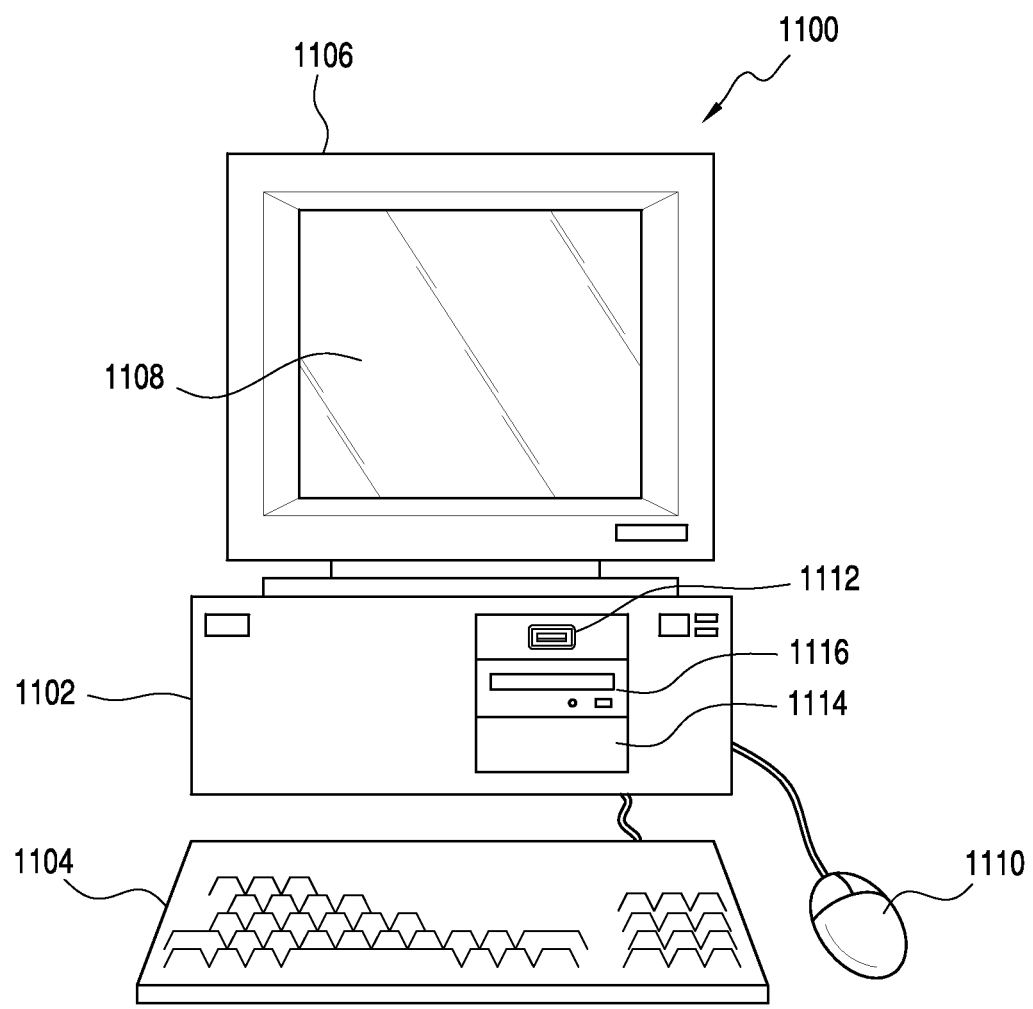
FIG. 11 illustrates a computer system that is suitable for implementing an embodiment of at least a portion of the message processing system of FIGS. 1-3.

In some embodiments, system 100 can include a message processing system 110. In many embodiments message processing system 110 can include a plurality of nodes, such as a node 120 (Node A) and a node 130 (Node B). In a number of embodiments, each node (e.g., 120, 130) can be a separate instance of message processing system 110. For example, each node (e.g., 120, 130) can be a separate instance of message processing system 110 running on a separate computer system, such as computer system 1100, as shown in FIG. 11 and described below. In several embodiments, node 120 can include a message queue 121, which can include messages, such as message 122. In many embodiments, node 130 can include a message queue 131, which can include messages, such as message 132. In a number of embodiments, message queue 121 can be a first instance of a message queue, and message queue 131 can be a second instance of the same message queue. In a number of embodiments, each of the nodes (e.g., 120, 130) of message processing system 110 can be connected to one or more other nodes (e.g., 120, 130) of message processing system 110 through one or more data communication links, such as data communication link 111. For example, data communication link 111 can be an Ethernet link, or another suitable data communications link.

In a number of embodiments, system 100 can include one or more publishers, such as publisher 140, and/or one or more subscribers, such as subscriber 150. The publishers (e.g., 140) and the subscribers (e.g., 150) can each be or can run on a computer system, such as computer system 1100, as shown in FIG. 11 and described below. In many embodiments, publisher 140 can publish to a message queue of a node of message processing system 110, such as to node 120. For example, publisher 140 can publish messages, such as message 122, to message queue 121 at node 120. In some embodiments, subscriber 150 can subscribe to a node of message processing system 110, such as node 130. For example, subscriber can subscribe to message queue 131 at node 130 to receive messages, such as message 132, from message queue 131.

In several embodiments, message processing system 110 can replicate messages (e.g., 122, 132) across message queues (e.g., 121, 131) at the nodes (e.g., 120, 130) of message processing system 110, such that messages (e.g., 122, 132) in different instances of the message queue (e.g., 121, 131) at different nodes (e.g., 120, 130) can be replicated and identical. For example, message 122 and message 132 can be identical, such that message 122 can be a first instance of a message and message 132 can be a second instance of the same message. To illustrate, after publisher 140 publishes message 122 to message queue 121 at node 120, message 122 can be replicated from node 120 to node 130 to create message 132 in message queue 131. In many embodiments, once a message has been delivered and acknowledged by a subscriber, each of the replicated messages can be dequeued from each of the instances of the message queue. For example, if message 132 is delivered from node 130 to subscriber 150, and subscriber 150 acknowledges delivery to node 130, message 132 can be dequeued from message queue 131 and message 122 also can be dequeued from message queue 121.

In many embodiments, when a publisher publishes a message to a node, that node can be assigned as the owner of the message. For example, when publisher 140 publishes message 122 to message queue 121 at node 120, node 120 can be assigned as the owner of message 122. In a number of embodiments, a node (e.g., 120, 130) can deliver a message to a subscriber (e.g., 150) only when that node owns the message. For example, when node 120 owns message 122, node 120 can deliver message 122 to a subscriber of node 120, if any exists, but node 130 cannot deliver message 132 in message queue 131 to subscriber 150 because node 130 does not currently own the message. In many embodiments, each message is owned by a single node at a time.

In various embodiments, a node can request ownership of a message. For example, if message 132 is deliverable to subscriber 150, node 130 can request ownership from node 120 of the message that is replicated as messages 122 and 132. In many embodiments, node 120 can send a notification to the other nodes (e.g., 130 and any other nodes within the message processing system) of message processing system 110 that node 130 is the new owner of the message, which can migrate the ownership of the message to node 130, and which can allow node 130 to deliver message 132 to subscriber 150.

Figure 2:
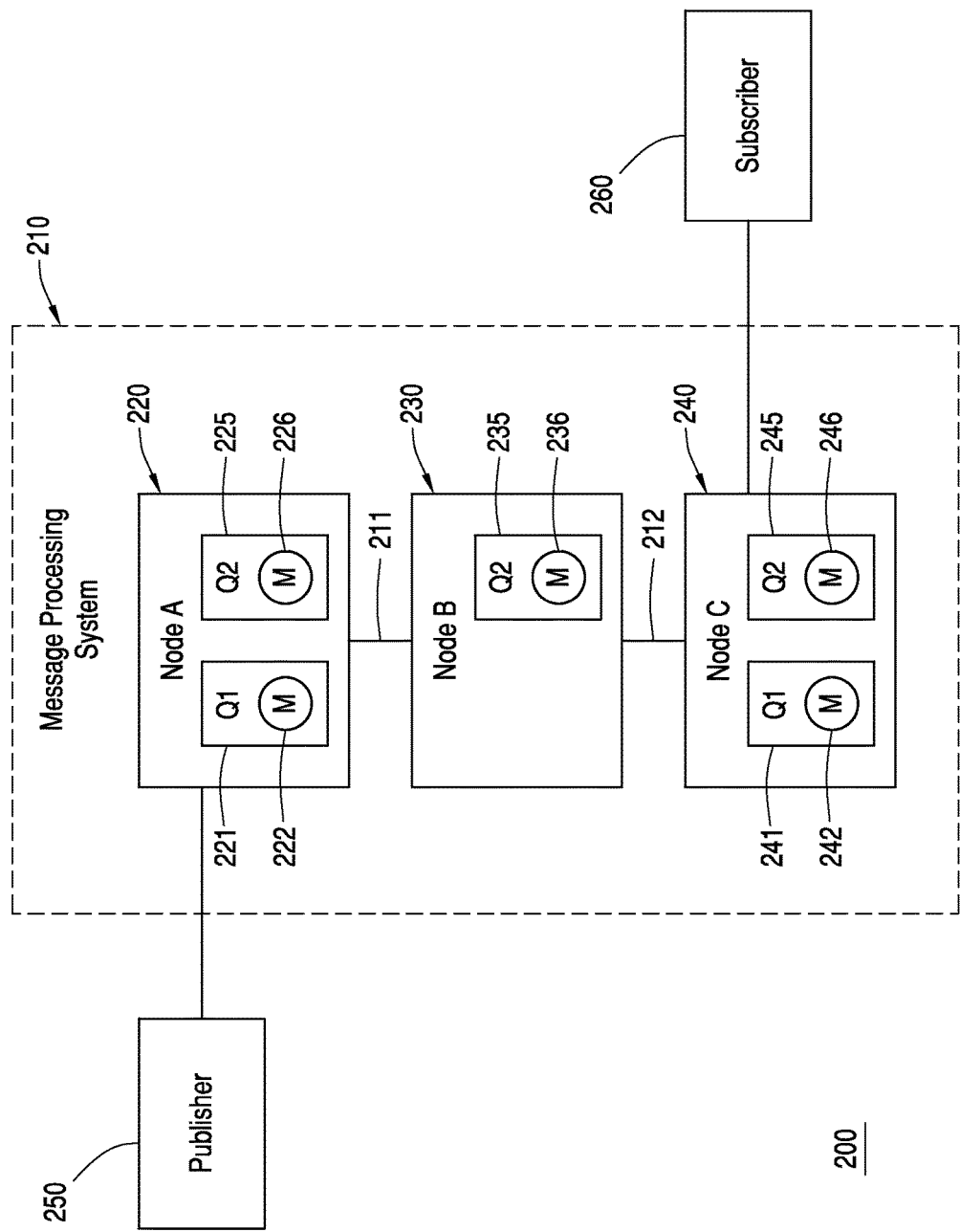
FIG. 2 illustrates a block diagram of a system, which can be employed to provide replication in message queuing, according to another embodiment.

Turning ahead in the drawings, FIG. 2 illustrates a block diagram of a system 200, which can be employed to provide replication in message queuing, according to an embodiment. System 200 is merely exemplary and embodiments of the system are not limited to the embodiments presented herein. The system can be employed in many different embodiments or examples not specifically depicted or described herein. In some embodiments, certain elements or modules of system 200 can perform various procedures, processes, and/or activities. In other embodiments, the procedures, processes, and/or activities can be performed by other suitable elements or modules of system 200.

In many embodiments, system 200 can include a message processing system 210, a publisher 250, and a subscriber 260. Message processing system 210 can be similar to message processing system 110 (FIG. 1), and various components of message processing system 210 can be similar or identical to various components of message processing system 110 (FIG. 1). Publisher 250 can be similar or identical to publisher 140 (FIG. 1), and/or subscriber 260 can be similar or identical to subscriber 150 (FIG. 1).

In a number of embodiments, message processing system 210 can include a plurality of nodes, such as a node 220 (Node A), a node 230 (Node B), and/or a node 240 (Node C). In many embodiments, each of the nodes (e.g., 220, 230, 240) of message processing system 210 can be connected to one or more other nodes (e.g., 220, 230, 240) of message processing system 210 through one or more data communication links, such as data communication links 211 and 212. Data communication links 211 and 212 can be similar or identical to data communication link 111 (FIG. 1). As shown in FIG. 1, node 220 can be connected to node 230 through data communication link 211 and node 230 can be connected to node 240 through data communication link 212. In a number of embodiments, publisher 250 can publish to node 220 and/or subscriber 260 can be subscribed to node 240.

In a number of embodiments, each node (e.g., 220, 230, 240) can be a separate instance of message processing system 210. Nodes 220, 230, and/or 240 can be similar to, and can have similar or identical components as, nodes 120 and/or 130 of FIG. 1. In many embodiments, node 220 can include a message queue 221, which can be an instance of a message queue Q1, and a message queue 225, which can be an instance of a message queue Q2; node 230 can include a message queue 235, which can be an instance of message queue Q2; and/or node 240 can include a message queue 241, which can be an instance of message queue Q1, and a message queue 245, which can be an instance of message queue Q2.

In some embodiments, each node (e.g., 220, 230, 240) of message processing system 210 can include replications of the same message queues (e.g., Q1, Q2). In other embodiments, only certain queues can be replicated in certain nodes, such as shown in FIG. 2. For example, as shown in FIG. 2, message queue Q1 is replicated as instance 221 at node 220 and instance 241 at node 240, but not replicated at node 230. Message queue Q2, by contrast, is replicated at each node of message processing system 210, specifically, as instance 225 at node 220, as instance 235 at node 230, and as instance 245 at node 240.

In many embodiments, message queues (e.g., Q1, Q2) can be abstractions that capture messages from an underlying topic. For example, the message queue (e.g., Q1, Q2) can reference a message in an underlying topic. In several embodiments, a message that is captured in multiple message queues (e.g., Q1, Q2) can be stored only once at each node, and each message queue (e.g., Q1, Q2) at the node can reference the underlying message. For example, a message M can be published by publisher 250 to node A and captured by both Q1 and Q2. Specifically, as message M can be captured as message 222 in message queue 221 and as message 226 in message queue 225.

In various embodiments, when a message is replicated across nodes (e.g., 220, 230, 240), the message queues (e.g., Q1, Q2) to which the message has been captured can be communicated to the other nodes. For example, node 220 can communicate that message M is captured in both message queues Q1 and Q2. Based on this information, when message M is replicated to node 230 from node 220, node 230 can replicate message M in message queue Q2 based on the information that message M is captured in message queues Q1 and Q2. Specifically, message M can be replicated as message 236 in message queue 235. When message M is replicated to node 240 from node 230, node 230 can pass along the information that message M is captured in both message queues Q1 and Q2, and based on this information, node 240 can replicate message M as message 242 in message queue 241 and as message 246 in message queue 245, even though message Q1 was not defined at node 230.

In some embodiments, for example, when a message is replicated across nodes (e.g., 220, 230, 240), a replication path can be communicated, which can include the message queues (e.g., Q1, Q2) in which the message is captured, and which, in a number of embodiments, can include a forwarding path of the nodes (e.g., 220, 230, 240). For example, the replication path from node 220 (Node A) to node 230 (Node B) can be, for example:

[["A",{"q":["Q1","Q2"]}]]

This replication path sent from Node A can indicate that Node A was the original owner of the message, that the message can be stored in each of message queues Q1 and Q2, if available.

The replication path from node 230 (Node B) to node 240 (Node C) can be, for example:

[["A",{"q":["Q1","Q2"]}],["B"]]

This replication path sent from Node B can indicate that Node A was the original owner of the message, that the message can be stored in each of message queues Q1 and Q2, if available, and that the replication of the message came through Node B.

The replication path from node 240 (Node C) to any additional further node can be, for example:

[["A",{"q":["Q1","Q2"]}],["B"],["C"]]

This replication path sent from Node C can indicate that Node A was the original owner of the message, that the message can be stored in each of message queues Q1 and Q2, if available, and that the path of replication of the message came through Node B and Node C. Based on the replication path, a node (e.g., 220, 230, 240) can know from which node to request ownership.

Figure 3:
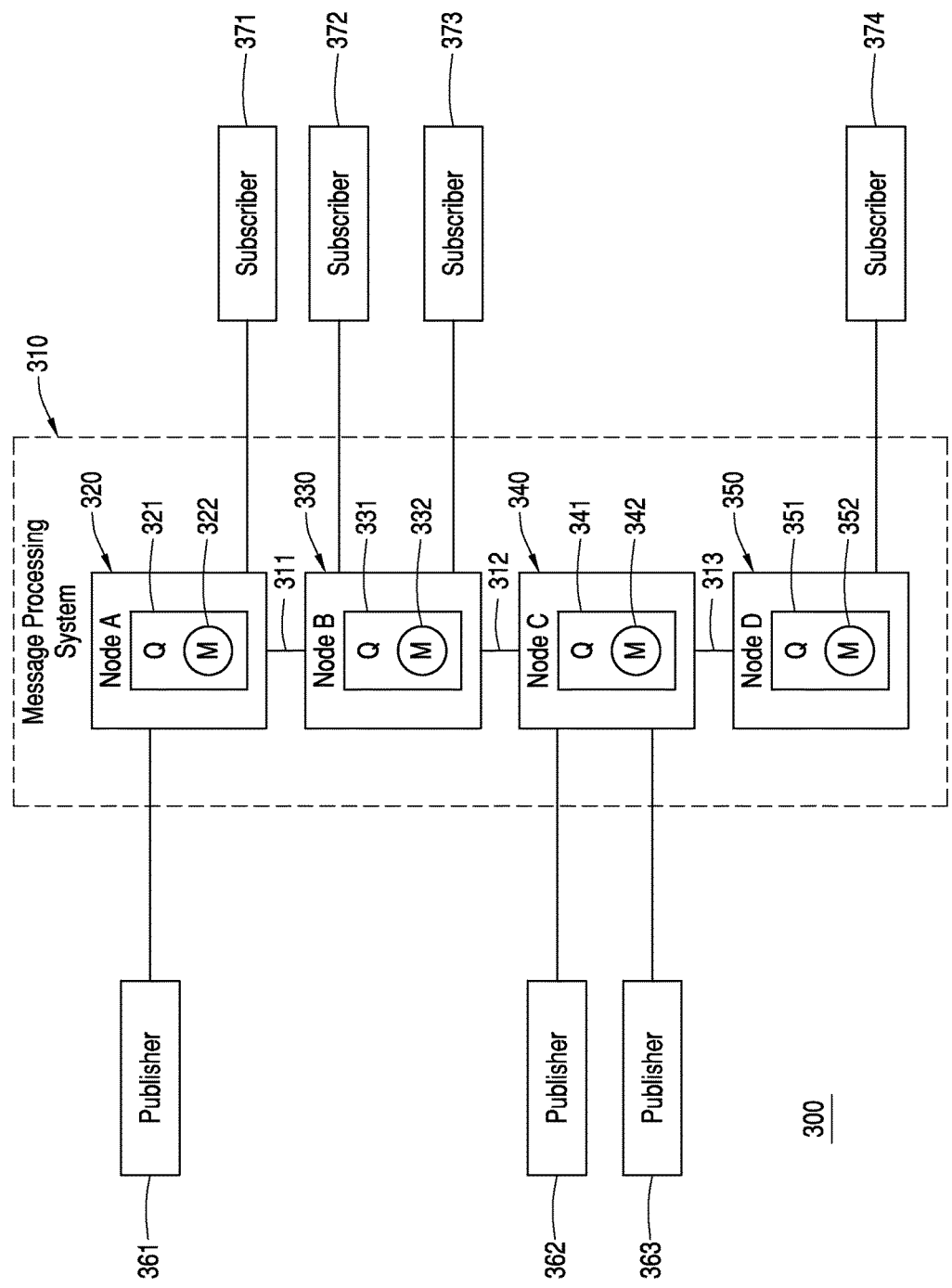
FIG. 3 illustrates a block diagram of a system, which can be employed to provide replication in message queuing, according to another embodiment.

Turning ahead in the drawings, FIG. 3 illustrates a block diagram of a system 300, which can be employed to provide replication in message queuing, according to an embodiment. System 300 is merely exemplary and embodiments of the system are not limited to the embodiments presented herein. The system can be employed in many different embodiments or examples not specifically depicted or described herein. In some embodiments, certain elements or modules of system 300 can perform various procedures, processes, and/or activities. In other embodiments, the procedures, processes, and/or activities can be performed by other suitable elements or modules of system 300.

In many embodiments, system 300 can include a message processing system 310, various publishers (e.g., publishers 361, 362, 363), and various subscribers (e.g., subscribers 371, 372, 373, 374). Message processing system 310 can be similar to message processing system 110 (FIG. 1) and/or message processing system 210 (FIG. 2), and various components of message processing system 310 can be similar or identical to various components of message processing system 110 (FIG. 1) and/or message processing system 210 (FIG. 2). Publishers 361-363 can be similar or identical to publisher 140 (FIG. 1) and/or publisher 250 (FIG. 2). Subscribers 371-374 can be similar or identical to subscriber 150 (FIG. 1) and/or subscriber 260 (FIG. 2).

In a number of embodiments, message processing system 310 can include a plurality of nodes, such as a node 320 (Node A), a node 330 (Node B), node 340 (Node C), and/or a node 350 (Node D). In many embodiments, each of the nodes (e.g., 320, 330, 340, 350) of message processing system 310 can be connected to one or more other nodes (e.g., 320, 330, 340, 350) of message processing system 310 through one or more data communication links, such as data communication links 311, 312, and 313. Data communication links 311-313 can be similar or identical to data communication link 111 (FIG. 1) and/or data communication links 211-212 (FIG. 2). As shown in FIG. 1, node 320 can be connected to node 330 through data communication link 311, node 330 can be connected to node 340 through data communication link 312, and/or node 340 can be connected to node 330 through data communication link 313.

In several embodiments, publisher 361 can publish to node 320, publisher 362 can published to node 340, and/or publisher 363 can publish to node 340. In various embodiments, subscriber 371 can be subscribed to node 320, subscriber 372 can be subscribed to node 330, subscriber 373 can be subscribed to node 330, and/or subscriber 374 can be subscribed to node 350. In many embodiments, subscribers (e.g., 371-374) can each subscribe to only a single node (e.g., 320, 330, 340, 350) at a time.

The configuration of the nodes, publishers, and subscribers shown in FIG. 3 is merely illustrative and exemplary, as are the configurations shown in FIGS. 1-2. Although message processing system 310 is shown with 4 nodes (e.g., 320, 330, 340, 350), other embodiments of the message processing system can have any suitable number of nodes. Additionally, although the nodes of the message processing system 310 are connected in the topology shown in FIG. 3, other embodiments of the message processing system can have other suitable topologies. Further, although system 300 is shown with three publishers (e.g., 361-363) and four subscribers (e.g., 371-374), each publishing or subscribing to certain nodes (e.g., 320, 330, 340, 350) of message processing system 310, other embodiments of the message processing system can have other suitable numbers of publishers and/or subscribers, which can be publishing or subscribing to various different nodes.

In a number of embodiments, each node (e.g., 320, 330, 340, 350) can be a separate instance of message processing system 310. Nodes 320, 330, 340, and/or 350 can be similar to, and can have similar or identical components as, nodes 120 and 130 of FIG. 1, and/or nodes 220, 230, and 240 of FIG. 2. In many embodiments, node 320 can include a message queue 321, which can be an instance of a message queue Q; node 330 can include a message queue 331, which can be an instance of message queue Q; node 340 can include a message queue 341, which can be an instance of message queue Q; and/or node 350 can include a message queue 351, which can be an instance of message queue Q.

In many embodiments, a message M can be published from publisher 361 to node 320 as message 322 in message queue 321. Message M can be replicated as message 332 in message queue 331 at node 330, as message 342 in message queue 341 at node 340, and a message 352 in message queue 352 in node 350. In some embodiments, message M can be owned by node 320 because publisher 361 published message M to node 310. Nodes 330, 340, and 350 each can be notified that message M is owned by node 320, such as in the manner described above. In a number of embodiments, additional messages can be published to message queue Q by publisher 361, and/or additional messages can be published to message queue Q by publishers 362-364, such as a message N can be published by publisher 362, a message O can be published by publisher 363, and a message P can be published by a publisher 364 (not shown), which can each be replicated to the other nodes (e.g., 320, 330, 340, 350).

In several embodiments, if message M is deliverable to subscriber 371, node 320 can deliver message M to subscriber 371 and wait for an acknowledgement. In many embodiments, each of the other nodes (e.g., 330, 340, 350) can be sent a message from node 320 indicating that message M has been sent and/or acknowledged. If message M is deliverable to subscribers 372 or 373, node 330 can send a request to node 320 for ownership of message M. Similarly, if message M is deliverable to subscriber 374, node D can send a request to node 320 for ownership of message M. If node 320 has not sent message M to subscriber 371, or delivery failed, node 320 can send a notification message to the other nodes (330, 340, 350) indicating that node 330 or node 350 is the new owner, which can allow ownership of the message to be migrated to node 330 or node 350, and can allow node 330 to deliver message M to subscriber 372 or 373, or allow node 350 to deliver message M to subscriber 374.

In many embodiments, nodes 330 and 350 can wait to request ownership from node 320 until after a threshold amount of time from when node 320 received message M or sent message M to subscriber 371. In several embodiments, each node (e.g., 320, 330, 340, 350) can track the average time θ that it takes each node (e.g., 320, 330, 340, 350), after sending the message to the subscriber (e.g., 371-374), to receive an acknowledgement for messages sent from each message queue (e.g., message queues 321, 331, 341, 351). Average time θ for each node can be a dynamic value that is updated based on the current delay in processing time for subscribers (e.g., 371-374) at each node. In some embodiments, average time θ can be weighted toward the delay time for receiving the most recent acknowledgment at each node. For example, after a new acknowledgment is received, average time θ can be updated to the average of the current θ and the delay time for receiving the new acknowledgment.

In many embodiments, average time θ can be tracked at each node for each of the other nodes based on notifications that the acknowledgment was received by the other node. For example, node 320 can send a message (e.g. message 322) from message queue 321 to subscriber 371, and after a delay period, node 320 can receive an acknowledgement that subscriber 371 has processed the message. Node 320 can then notify each of the other nodes (e.g., 330, 340, 350) that the acknowledgement for the message has been received. When node 350 receives the notice of acknowledgement, node 350 can update its tracked value of average time θ for message queue 321 at node 320 to receive acknowledgments.

In many embodiments, a node (e.g., 320, 330, 340, 350) that is not the owner, but has a message that is deliverable to a subscriber, can wait for a time to request ownership. For example, the time that the node (e.g., 320, 330, 340, 350) waits can be average time θ or a factor thereof, such as 2*θ.

In some embodiments, average time θ can have an initial value. For example, in a number of embodiments, the initial value of average time θ can be 0, such that when no subscriber is subscribed to a message queue (e.g., 321, 331, 341, 351) at a node (e.g., 320, 330, 340, 350), average time θ can be 0 and the other nodes can immediately request ownership of a message the message queue of the node that owns the message. In many embodiments, average time θ can have a maximum value. For example, in various embodiments, average time θ can have a maximum value of 5 seconds, such that other nodes that do not own the message can begin to request ownership without undue delay.

As an example, publisher 361 can publish message M to message queue Q at node 320, which is stored as message 322 in message queue 321 at node 320, and replicated to each of the other nodes, as described above. Node 320 can be assigned as the owner of message 322, and can detect that message 322 is deliverable to subscriber 371, and deliver the message to subscriber 371. Meanwhile, nodes 330 and/or 350 can detect that message M is deliverable to subscriber 374, and nodes 330 and/or 350 can wait for average time θ for message queue 321 at node 320 to receive acknowledgements, and then, if no acknowledgement has been received from subscriber 371, nodes 330 and/or 350 can send a request for ownership of message M to node 320. Because node 320 has sent the message to subscriber 371, node 320 can ignore requests for transfer of ownership until it receives an acknowledgement from subscriber 371 or the maximum time for subscriber 371 to process the message has been exceeded such that the delivery of the message to subscriber 371 times out (in other words, the lease for the message is broken). When the lease is broken, node 320 can transfer ownership of message M to another node that is requesting ownership (e.g., node 330, 350). In many embodiments, a node (e.g., nodes 330 or 350) can continue to request ownership of message M periodically (e.g., at every repeated expiration of average time θ) until that node (a) receives notification that subscriber 371 sent an acknowledgement, (b) receives notification that another node has received ownership of message M, or (c) receives for itself ownership of message M.

To further illustrate, if the lease for delivery of message M is broken at node 320, node 320 can receive a request for ownership from node 350, for example, and node 320 can update the recorded owner of message M in node 320 and can send a notification to each of the other nodes (e.g., 330, 340, 350) that node 350 is the new owner. After ownership of message M has transferred from node 320 to node 350, for example, each of the other nodes can know, based on the notification message, that node 350 is the new owner. Node 350 can deliver message M to subscriber 374. If message M is deliverable to subscriber 372 at node 330, node 330 can periodically, such as after each repeated expiration of the average time θ for messages to be acknowledged when delivered from message queue 351 at node 350, request ownership of message M. Node 330 can know to request ownership of message M from node 350 through its adjacent node, node 340, based on the replication path when ownership changed from node 320 to node 350. If delivery of message M times out at node 350, and node 330 is still requesting ownership, node 350 can transfer ownership to node 330 by updating the recorded owner of message M in node 350 and sending an ownership migration notification to each of the other nodes (e.g., 320, 330, 340) that indicates that node 330 is the new owner. When node 330 receives the notification of ownership, node 330 can deliver message M to subscriber 372.

In many embodiments, replication of message queues using the systems and methods described herein can beneficially provide message queuing with first in, first out ordering for subscribers and can ensure that only one subscriber receives each message. In various embodiments, replication of message queues using the systems and methods described can provide for load balancing and distribute work order management in a highly available manner.

As an example, embodiments of the message processing systems described herein can provide an interface for an automated code system building system connected to a number of subscriber machines in a grid. Work items can be submitted from publisher machines to the message processing system, which can distribute the work items to individual subscriber machines in a distributed manner that maintains balance of work among the machines and provides high availability if a subscriber machine fails.

In some embodiments, each message can be replicated across each node of the message processing system, and can be persistent in storage at each node, even after the message is dequeued after an acknowledgement. In other embodiments, the messages can be erased after the message is dequeued from the message queue.

In a number of embodiments, a subscriber can subscriber can batch process multiple messages at a time. For example, a subscriber can subscribe to a node of the message processing system and indicate that it can receive 50 messages at a time. As the subscriber acknowledges that it has finished the first five messages, the node can sent five additional messages without the subscriber needing to ask for additional messages. In other embodiments, the node can wait to send additional messages until the subscriber send a take message indicating that more messages can be sent to the subscriber.

In various embodiments, the message processing system can be used in combination with a complex event processing (CEP) system. For example, a view can be setup in the CEP system to provide a statistic, such as average order price, such as based on orders that a processed through a message queue. Based on this configuration, statistics of the message queue can be provided and updated in real-time.

Figure 4:
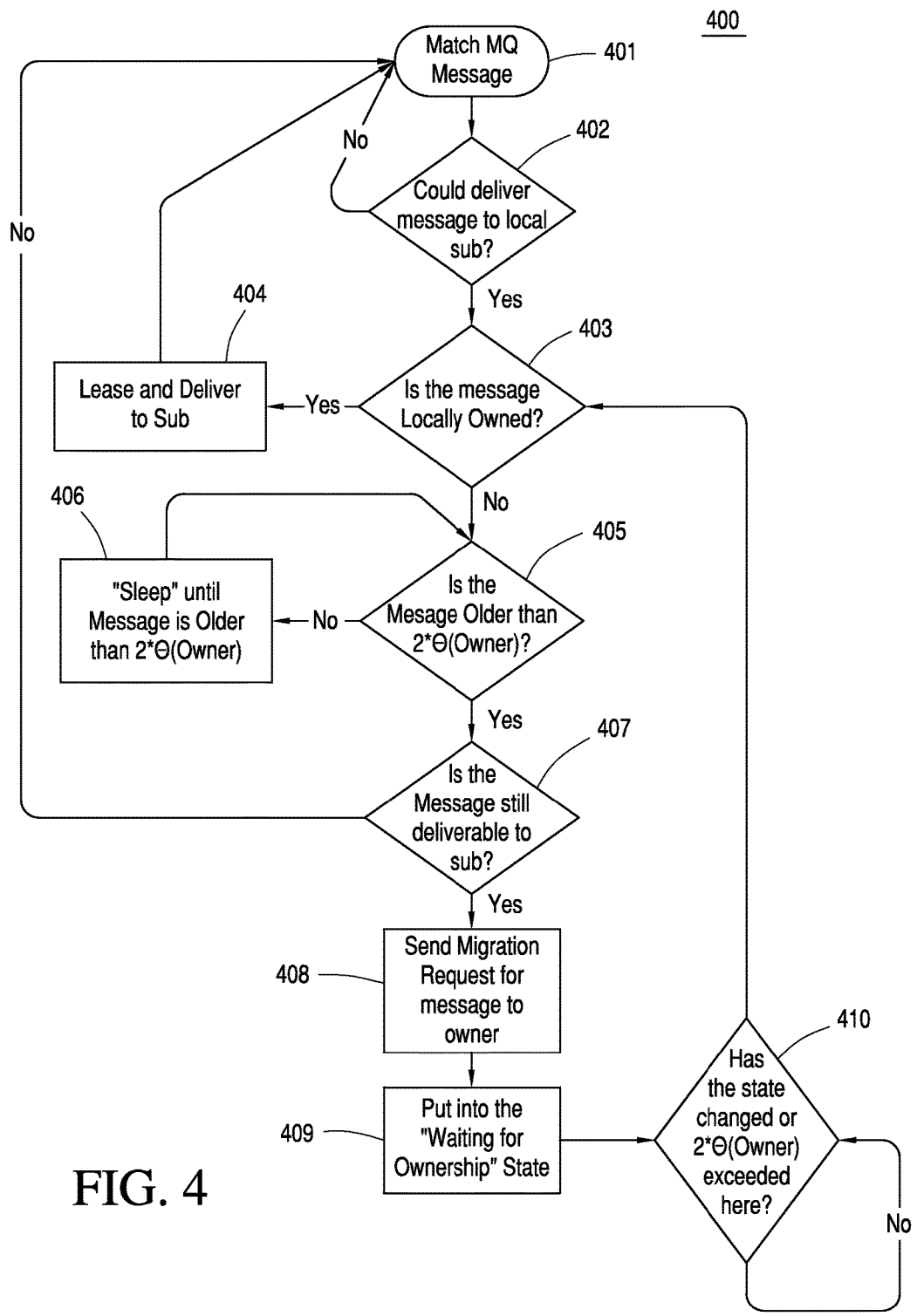
FIG. 4 illustrates a flow chart for a process of matching a message queue message to a subscriber, which can be employed as part of providing replication in message queuing, according to an embodiment.

Turning ahead in the drawings, FIG. 4 illustrates a flow chart for a process 400 of matching a message queue (MQ) message to a subscriber, which can be employed as part of providing replication in message queuing, according to an embodiment. Process 400 is merely exemplary and embodiments of the process are not limited to the embodiments presented herein. The process can be employed in many different embodiments or examples not specifically depicted or described herein. In some embodiments, the procedures, the processes, and/or the activities of process 400 can be performed in the order presented. In other embodiments, the procedures, the processes, and/or the activities of process 400 can be performed in any suitable order. In still other embodiments, one or more of the procedures, the processes, and/or the activities of process 400 can be combined or skipped. In many embodiments, process 400 can be run at each node (e.g., 320, 330, 340, 350 of FIG. 3) of the message processing system (e.g., 310 (FIG. 3)).

Referring to FIG. 4, in some embodiments, the flow of process 400 can begin at a block 401 when there is a message in the message queue of the instant node that is running process 400. In many embodiments, each node that includes an instance of a message can proceed with the flow of process 400 starting at block 401 when there is a message to be processed a message queue at the node.

In many embodiments, the flow of process 400 can proceed from block 401 to a block 402 of determining whether the message in the message queue of the instant node running process 400 can deliver the message to a subscriber that is local to the instant node. If so, the flow of process 400 can proceed to a block 403. Otherwise, the flow of process 400 can return to block 401, which can allow process 400 to cycle through waiting for a message that can be delivered to a local subscriber.

At block 403, process 400 can include determining if the message is locally owned. In other words, the instant node running process 400 can determine whether the instant node is the owner of the message. If so, the flow of process 400 can proceed to a block 404. Otherwise, the flow of process 400 can proceed to a block 405.

At block 404, process 400 can include leasing and delivering the message to the local subscriber. After block 404, the flow of process 400 can return to block 401.

At block 405, process 400 can include determining if the message is older than a factor of average time θ of the message queue of the owner of the message, such as 2*θ. If so, the flow of process 400 can proceed to a block 407. Otherwise, the flow of process can proceed to a block 406.

At block 406, process 400 can include sleeping or performing other tasks until the message is older than 2*θ. After block 406, the flow of process 400 can return to block 405.

At block 407, process 400 can include determining if the message is still deliverable to the subscriber. If so, the flow of process 400 can proceed to a block 408. Otherwise, the flow of process 400 can return to block 401.

At block 408, process 400 can include sending a migration request for ownership of the message to the owner of the message. After block 408, the flow of process 400 can proceed to a block 409.

At block 409, process 400 can include putting the instant node into a "waiting for ownership" state. After block 409, the flow of process 400 can proceed to a block 410.

At block 410, process 400 can include determining whether the state of ownership of the message has changed or the wait for ownership since block 409 has exceeded 2*θ. If so, the flow of process 400 can return to block 403. Otherwise, the flow of process 400 can stay at block 410 to wait for a change in the state of ownership of the message of for the wait to exceed 2*θ.

Figure 5:
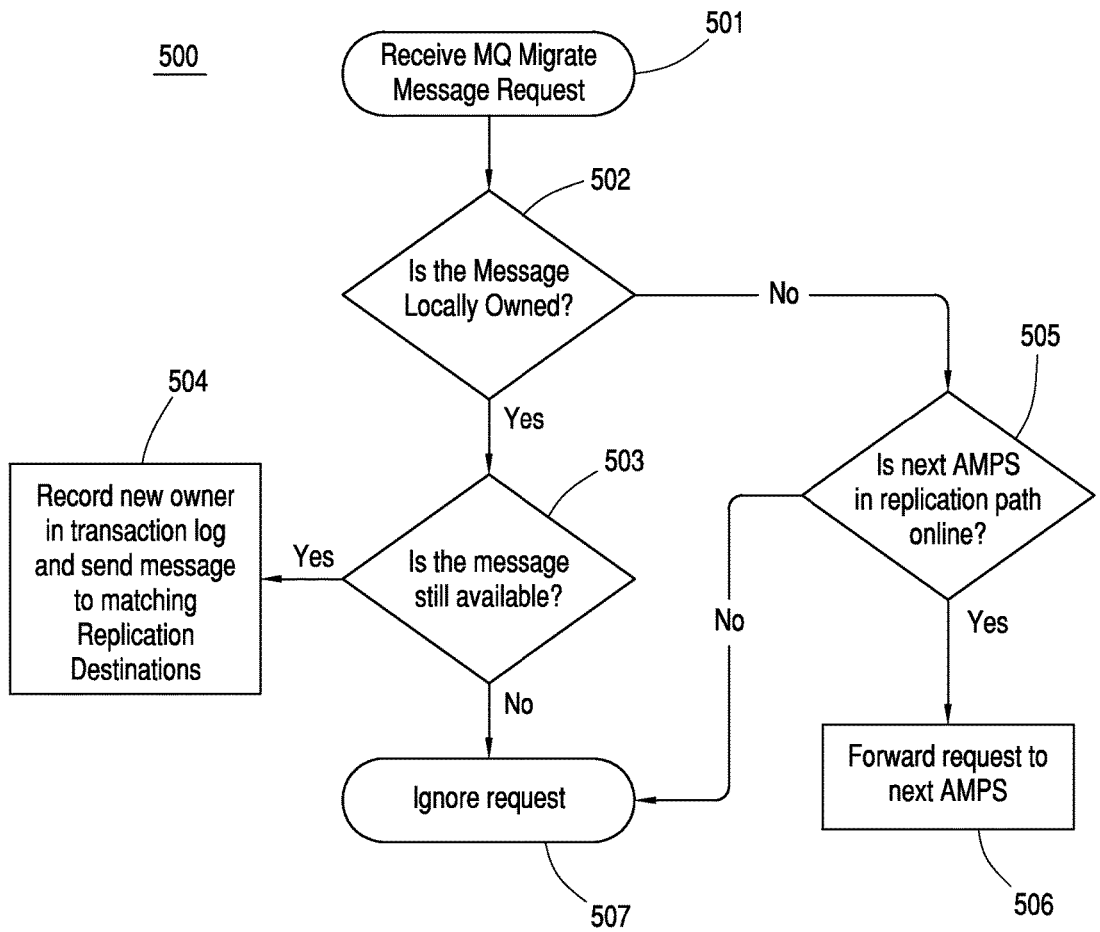
FIG. 5 illustrates a flow chart for a process of handling a message queue migrate message request, which can be employed as part of providing replication in message queuing, according to an embodiment.

Turning ahead in the drawings, FIG. 5 illustrates a flow chart for a process 500 of handling a message queue migrate message request, which can be employed as part of providing replication in message queuing, according to an embodiment. Process 500 is merely exemplary and embodiments of the process are not limited to the embodiments presented herein. The process can be employed in many different embodiments or examples not specifically depicted or described herein. In some embodiments, the procedures, the processes, and/or the activities of process 500 can be performed in the order presented. In other embodiments, the procedures, the processes, and/or the activities of process 500 can be performed in any suitable order. In still other embodiments, one or more of the procedures, the processes, and/or the activities of process 500 can be combined or skipped. In many embodiments, process 500 can be run at each node (e.g., 320, 330, 340, 350 of FIG. 3) of the message processing system (e.g., 310 (FIG. 3)) in certain circumstances.

Referring to FIG. 5, in some embodiments, the flow of process 500 can begin at a block 501 of receiving a migrate message request at the instant node that is running process 500. In many embodiments, each node can proceed with the flow of process 500 starting at block 501 when a migrate message request is received at the node. For example, the migrate message request can be received from another node that sent the migrate message request in block 408 (FIG. 4).

In many embodiments, the flow of process 500 can proceed from block 501 to a block 502 of determining whether the message is locally owned at the instant node. If so, the flow of process 500 can proceed to a block 503. Otherwise, the flow of process 500 can proceed to a block 505.

At block 503, process 500 can include determining whether the message is still available. If so, the flow of process 500 can proceed to a block 504. Otherwise, the flow of process 500 can proceed to a block 507.

At block 504, process 500 can include recording the new owner (i.e., the node that requested ownership of the message) in a transaction log of the instant node that is running process 500 and sending a migration action message to each of the other nodes. After processing block 504, the flow of process 500 can terminate.

At block 505, process 500 can include determining whether the next node in the replication path is online. If so, the flow of process 500 can proceed to a block 506. Otherwise, the flow of process 500 can proceed to block 507, which can mean that the messages on a down node are not available to other instances. In some embodiments, a migration tool can be used to migrate the messages or an method for allowing a node to steal ownership can be employed.

At block 506, process 500 can include forwarding the request to the next node in the replication path. After processing block 506, the flow of process 500 can terminate.

At block 507, process 500 can include ignoring the request. After processing block 507, the flow of process 500 can terminate.

Figure 6:
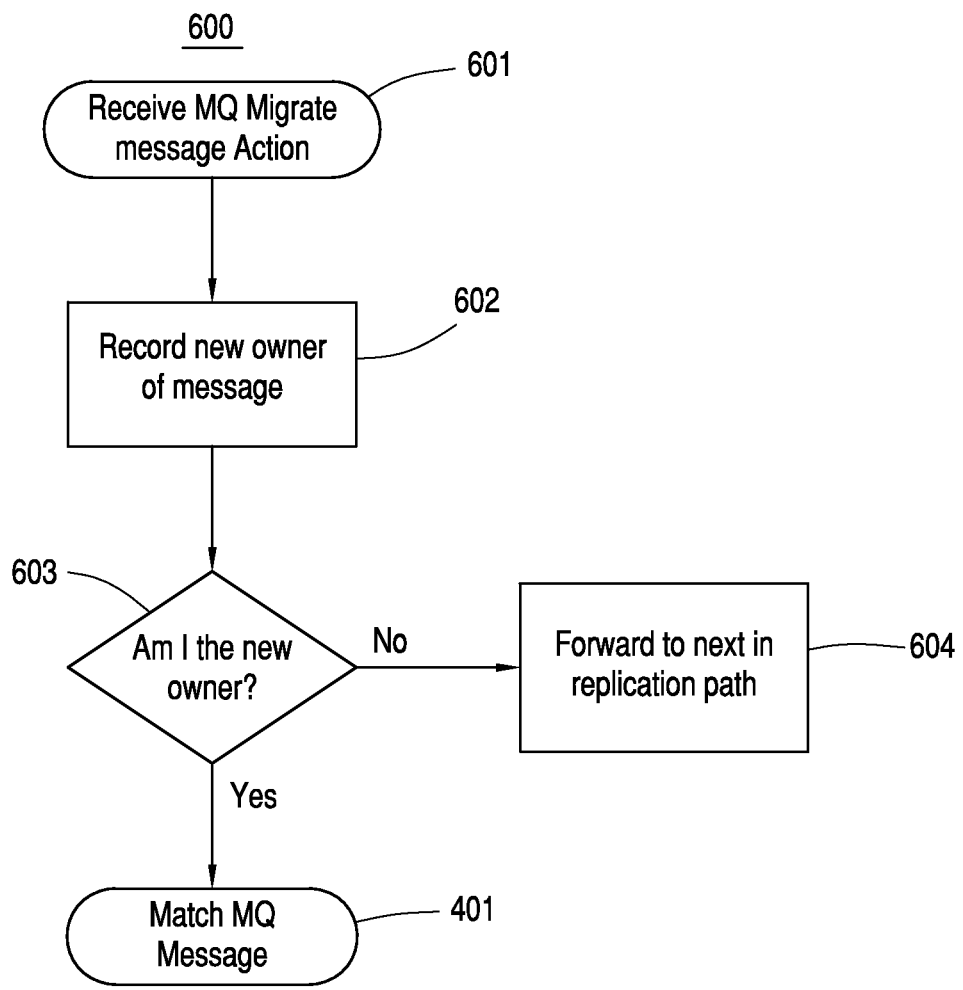
FIG. 6 illustrates a flow chart for a process of handling a message queue migrate message action, which can be employed as part of providing replication in message queuing, according to an embodiment.

Turning ahead in the drawings, FIG. 6 illustrates a flow chart for a process 600 of handling a message queue migrate message action, which can be employed as part of providing replication in message queuing, according to an embodiment. Process 600 is merely exemplary and embodiments of the process are not limited to the embodiments presented herein. The process can be employed in many different embodiments or examples not specifically depicted or described herein. In some embodiments, the procedures, the processes, and/or the activities of process 600 can be performed in the order presented. In other embodiments, the procedures, the processes, and/or the activities of process 600 can be performed in any suitable order. In still other embodiments, one or more of the procedures, the processes, and/or the activities of process 600 can be combined or skipped. In many embodiments, process 600 can be run at each node (e.g., 320, 330, 340, 350 of FIG. 3) of the message processing system (e.g., 310 (FIG. 3)) in certain circumstances.

Referring to FIG. 6, in some embodiments, the flow of process 600 can begin at a block 601 of receiving a migrate message action indicating that ownership of a message is being changed. In many embodiments, each node can proceed with the flow of process 600 starting at block 601 when a migrate message action is received at the node. For example, the migrate message action can be received from another node that sent the migrate message request in block 504 (FIG. 5).

In many embodiments, the flow of process 600 can proceed from block 601 to a block 602 of recording the new owner of the message in the transaction log of the instant node. After processing block 601, the flow of process 600 can proceed to a block 603.

At block 603, process 600 can include determining if the instant node is the new owner specified in the migrate message action. If so, the flow of process 600 can proceed to block 401 of FIG. 4. Otherwise, the flow of process 600 can proceed to a block 604.

At block 604, process 600 can include forwarding the migrate message action to the next node in the replication path. After processing block 604, the flow of process 600 can terminate.

Figure 7:
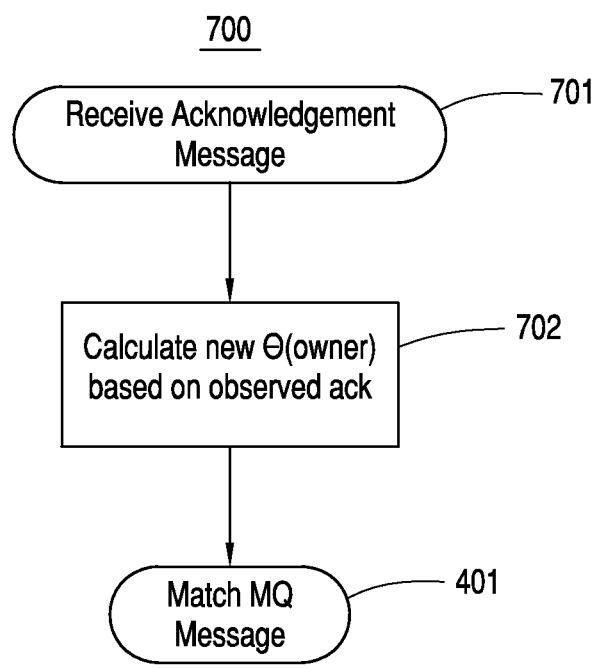
FIG. 7 illustrates a flow chart for a process of handling an acknowledgement message, which can be employed as part of providing replication in message queuing, according to an embodiment.

Turning ahead in the drawings, FIG. 7 illustrates a flow chart for a process 700 of handling an acknowledgement message, which can be employed as part of providing replication in message queuing, according to an embodiment. Process 700 is merely exemplary and embodiments of the process are not limited to the embodiments presented herein. The process can be employed in many different embodiments or examples not specifically depicted or described herein. In some embodiments, the procedures, the processes, and/or the activities of process 700 can be performed in the order presented. In other embodiments, the procedures, the processes, and/or the activities of process 700 can be performed in any suitable order. In still other embodiments, one or more of the procedures, the processes, and/or the activities of process 700 can be combined or skipped. In many embodiments, process 700 can be run at each node (e.g., 320, 330, 340, 350 of FIG. 3) of the message processing system (e.g., 310 (FIG. 3)) in certain circumstances.

Referring to FIG. 7, in some embodiments, the flow of process 700 can begin at a block 701 of receiving an acknowledgement message indicating that an acknowledgment was received by another node. In many embodiments, each node can proceed with the flow of process 700 starting at block 701 when an acknowledgement message action is received at the node.

In many embodiments, the flow of process 700 can proceed from block 701 to a block 702 of calculating a new θ for the message queue of the node that is the owner of the message that was delivered. In a number of embodiments, the new θ for the owner, or θ (owner), can be set to the average of the current θ (owner) value and the difference between the transaction time (txtime) when the message was sent to the subscriber (or, in some embodiments, received from the publisher), and the time when the acknowledgement was received (acktime). As described above, in some embodiments, the initial θ (owner) can be set to 0 seconds and the maximum value can be set to a value, such as 5 seconds (s). In a number of embodiments, the update of θ (owner) can be described as follows:

$$\theta(owner) = MIN(5\ s, (\theta(owner) + (txtime - acktime))/2)$$

In many embodiments, the new θ (owner) can be stored in the instant node running process 700. In several embodiments, after block 702 is processed, the flow of process 700 can proceed to block 401 of FIG. 4.

Figure 8:
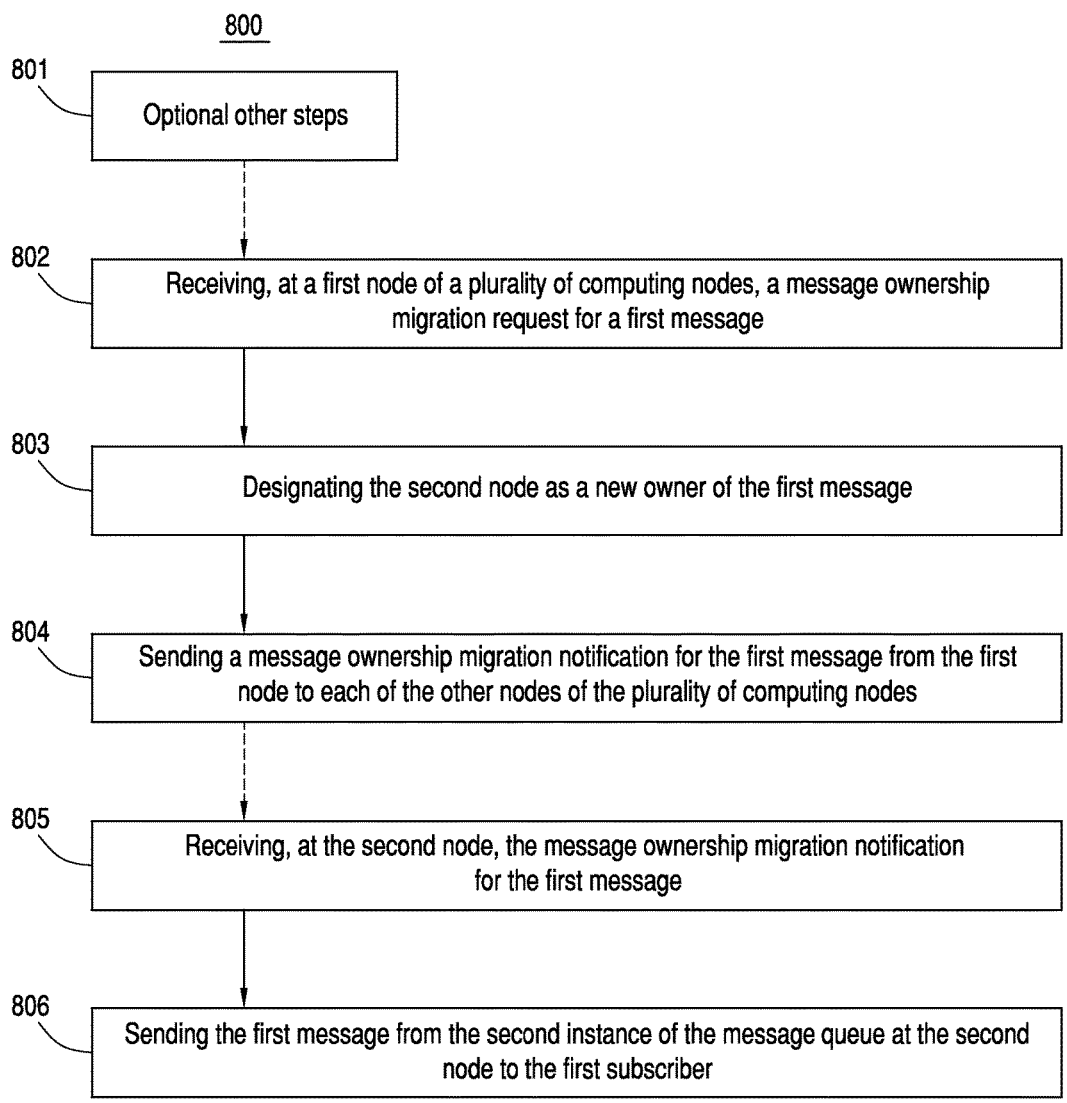
FIG. 8 illustrates a flow chart for a method, according to an embodiment.

Turning ahead in the drawings, FIG. 8 illustrates a flow chart for a method 800, according to an embodiment. In some embodiments, method 800 can be a method of providing replication in message queuing. Method 800 is merely exemplary and is not limited to the embodiments presented herein. Method 800 can be employed in many different embodiments or examples not specifically depicted or described herein. In some embodiments, the procedures, the processes, and/or the activities of method 800 can be performed in the order presented. In other embodiments, the procedures, the processes, and/or the activities of method 800 can be performed in any suitable order. In still other embodiments, one or more of the procedures, the processes, and/or the activities of method 800 can be combined or skipped.

Figure 9:
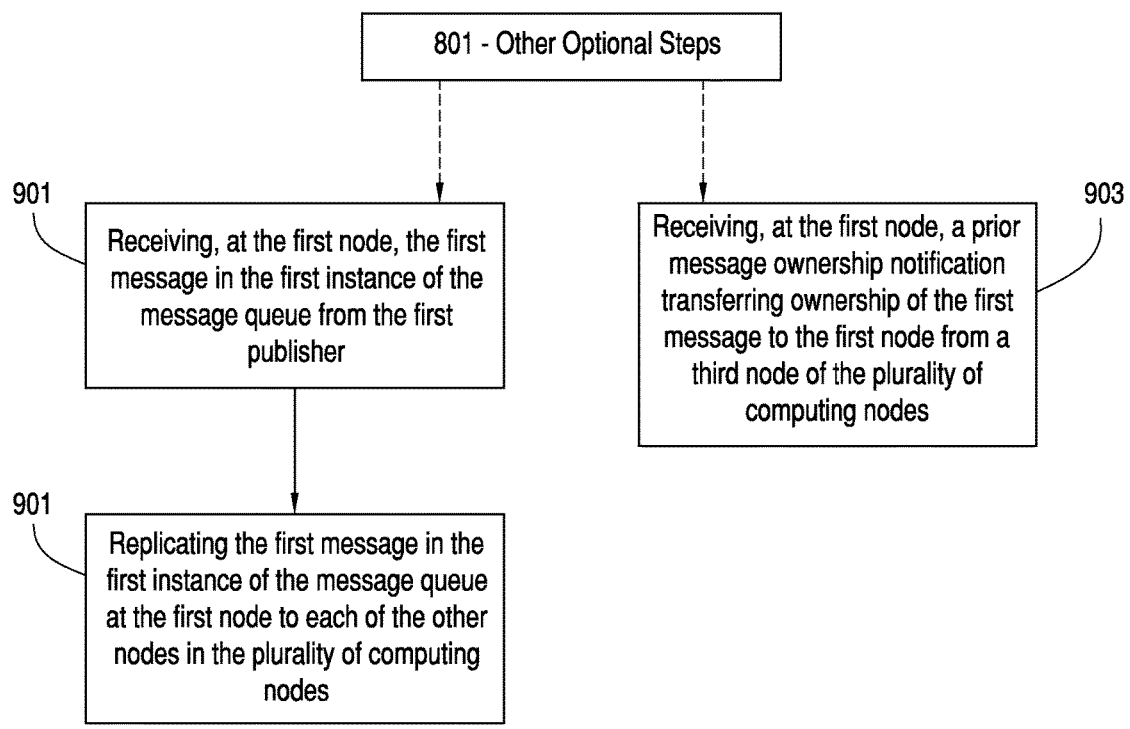
FIG. 9 illustrates a block of optional other steps, according to the embodiment of FIG. 8.

Referring to FIG. 8, in some embodiments, method 800 can include a block 801 of optional other steps, as shown in FIG. 9 and described below. In some embodiments, method 800 can skip block 801 of optional other steps.

In a number of embodiments, method 800 additionally can include a block 802 of receiving, at a first node of a plurality of computing nodes, a message ownership migration request for a first message. The first node can be similar or identical to one of nodes 120 or 130 in FIG. 1, nodes 220, 230, or 240 in FIG. 2, or nodes 320, 330, 340, or 350 in FIG. 3. The first message can be similar or identical to the message replicated as messages 122 and 132 in FIG. 1, the message M replicated as messages 222, 226, 236, 242, and 246 in FIG. 2, and/or the message M replicated as messages 322, 332, 342, and 352 in FIG. 3. The message ownership migration request can be similar or identical to the migration request for ownership sent at block 408 (FIG. 4) and/or the migrate message request received at block 501 (FIG. 5). In several embodiments, the message ownership migration request can originate from a second node of the plurality of computing nodes. The second node can be similar or identical to another one of nodes 120 or 130 (FIG. 1), nodes 220, 230, or 240 (FIG. 2), or nodes 320, 330, 340, or 350 (FIG. 3).

In a number of embodiments, the first node can be the owner of the first message in a first instance of a message queue at the first node. The first instance of the message queue can be similar or identical to one of message queues 121 or 131 in FIG. 1, message queues 221, 225, 235, 241, or 245 in FIG. 2, or message queues 321, 331, 341, or 351 in FIG. 3. In several embodiments, the first message can be published from a first publisher to the message queue at one of the nodes of the plurality of computing nodes. The first publisher can be similar or identical to one of publisher 140 (FIG. 1), publisher 250 (FIG. 2), or publishers 361, 362, or 363 (FIG. 3). In various embodiments, the first message in the first instance of the message queue at the first node can be replicated at a second instance of the message queue at the second node. The second instance of the message queue at the second node can be similar or identical to another one of message queues 121 or 131 in FIG. 1, message queues 221, 225, 235, 241, or 245 in FIG. 2, or message queues 321, 331, 341, or 351 in FIG. 3. In many embodiments, a first subscriber can be subscribed to the second instance of the message queue at the second node. The first subscriber can be similar or identical to one of subscriber 150 (FIG. 1), subscriber 260 (FIG. 2), or subscribers 371, 372, 373, 374 (FIG. 3). In a number of embodiments, the first subscriber is not subscribed to the first instance of the message queue at the first node.

In several embodiments, the second node can send the message ownership migration request to the first node when the first message in the second instance of the message queue is deliverable to the first subscriber from the second node and the first node has been the owner of the first message for longer than a first threshold. In many embodiments, the first threshold can be based at least in part on an average time for the first node to receive an acknowledgement of completion from one or more second subscribers that are subscribed to the first node for messages delivered from the first instance of the message queue to the one or more second subscribers. For example, the first threshold can be based at least in part on average time θ, as described above.

In a number of embodiments, the second node can send the message ownership migration request to the first node through a fourth node of the plurality of computing nodes along a replication path of the plurality of computing nodes. The fourth node can be similar or identical to another one of nodes 120 or 130 (FIG. 1), nodes 220, 230, or 240 (FIG. 2), or nodes 320, 330, 340, or 350 (FIG. 3).

In various embodiments, the first message in the first instance of the message queue at the first node can be identical to a second message in a first instance of a second message queue at the first node. For example, the first instance of the message queue at the first node can be similar or identical to message queue 221 at node 220, the first instance of the second message queue at the first node can be similar or identical to message queue 225 at node 220, the first message can be similar or identical to message 222 and the second message can be similar or identical to message 226. In many embodiments, the first message can be stored in the first instance of the message queue and the second message can be stored in the first instance of the second message queue as references to a message in an underlying queue. For example, the underlying queue can be similar or identical to message queue M, described above in connection with FIG. 2.

In a number of embodiments, method 800 additionally can include a block 803 of designating the second node as a new owner of the first message such that the first node is no longer the owner of the first message. In some embodiments, for example, the first node can record the second node as the new owner of the first message in a transaction log at the first node. In some embodiments, designating the second node as the new owner of the first message comprises designating the second node as the new owner of the first message when: (a) there is no subscriber subscribed to the first instance of the message queue at the first node, (b) the first message is not deliverable to a subscriber subscribed to the first instance of the message queue at the first node, and/or (c) a lease is broken for the first message sent from the first node to the subscriber subscribed to the first instance of the message queue at the first node.

In several embodiments, method 800 further can include a block 804 of sending a message ownership migration notification for the first message from the first node to each of the other nodes of the plurality of computing nodes. The message ownership migration notification can be similar or identical to the migration message action sent at block 504 (FIG. 5) and/or the migrate message action received at block 601 (FIG. 1). In a number of embodiments, the message ownership migration notification can identify the second node as the new owner of the first message.

In a number of embodiments, method 800 optionally can include a block 805 of receiving, at the second node, the message ownership migration notification for the first message.

In several embodiments, method 800 further can include a block 806 of sending the first message to the first subscriber from the second instance of the message queue at the second node.

Turning ahead in the drawings, FIG. 9 illustrates a block 801 of optional other steps, according to an embodiments. Block 801 is merely exemplary and is not limited to the embodiments presented herein. Block 801 can be employed in many different embodiments or examples not specifically depicted or described herein. In some embodiments, the procedures, the processes, and/or the activities of block 801 can be performed in the order presented. In other embodiments, the procedures, the processes, and/or the activities of block 801 can be performed in any suitable order. In still other embodiments, one or more of the procedures, the processes, and/or the activities of block 801 can be combined or skipped.

Referring to FIG. 9, block 801 can include a block 901 of receiving, at the first node, the first message in the first instance of the message queue from the first publisher. In many embodiments, the first node can be an initial owner of the first message.

In a number of embodiments, block 801 can include, after block 901, a block 902 of replicating the first message in the first instance of the message queue at the first node to each of the other nodes in the plurality of computing nodes with an indication that the first node is the owner of the first message. In some embodiments, block 901 can include sending a replication path that indicates at each receiving node of the other nodes a forwarding order of nodes in the plurality of computing nodes from the first node to the receiving node.

In some embodiments, block 801 can include a block 903 of receiving, at the first node, a prior message ownership notification that transferred ownership of the first message to the first node from a third node of the plurality of computing nodes. The second node can be similar or identical to another one of nodes 120 or 130 (FIG. 1), nodes 220, 230, or 240 (FIG. 2), or nodes 320, 330, 340, or 350 (FIG. 3).

Figure 10:
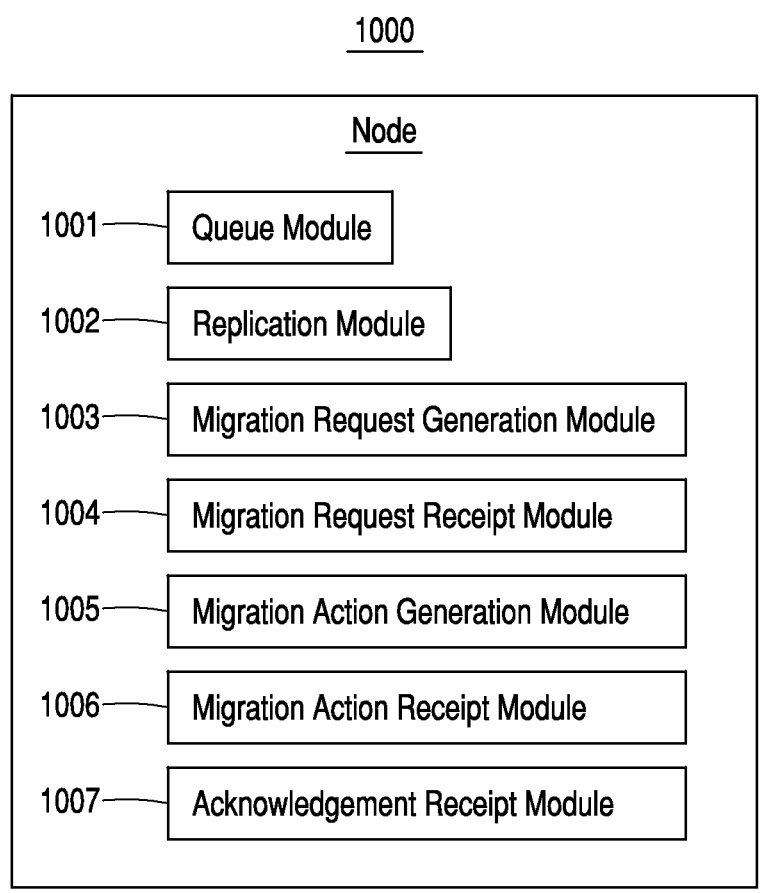
FIG. 10 illustrates a block diagram of a node, which can be suitable for implementing nodes, according to the embodiments of FIGS. 1-3.

Turning ahead in the drawings, FIG. 10 illustrates a block diagram of a node 1000, according to an embodiment, which can be suitable for implementing an embodiments of node 120 (FIG. 1), node 130 (FIG. 1), node 220 (FIG. 2), node 230 (FIG. 2), node 240 (FIG. 2), node 320 (FIG. 3), node 330 (FIG. 3), node 340 (FIG. 3), and/or node 350 (FIG. 3). Node 1000 is merely exemplary, and embodiments or the node are not limited to the embodiments presented herein. Node 1000 can be employed in many different embodiments or examples not specifically depicted or described herein. In some embodiments, certain elements or modules of node 1000 can perform various procedures, processes, and/or acts. In other embodiments, the procedures, processes, and/or acts can be performed by other suitable elements or modules.

In many embodiments, node 1000 can include a queue module 1001. In several embodiments, queue module 1001 can at least partially perform block 402 (FIG. 4) of determining whether the message in the message queue of the instant node can deliver the message to a subscriber that is local to the instant node, block 403 (FIG. 4) of determining if the message is locally owned, block 404 (FIG. 4) of leasing and delivering the message to the local subscriber, block 502 (FIG. 5) of determining whether the message is locally owned at the instant node, block 503 (FIG. 5) of determining whether the message is still available, block 602 (FIG. 6) of recording the new owner of the message in the transaction log of the instant node, block 806 (FIG. 8) of sending the first message to the first subscriber from the second instance of the message queue at the second node, and/or block 901 (FIG. 9) of receiving, at the first node, the first message in the first instance of the message queue from the first publisher.

In a number of embodiments, node 1000 can include a replication module 1002. In several embodiments, replication module 1002 can at least partially perform block 505 (FIG. 5) of determining whether the next node in the replication path is online, block 506 (FIG. 5) of forwarding the request to the next node in the replication path, block 604 (FIG. 6) of forwarding the migrate message action to the next node in the replication path, and/or block 902 (FIG. 9) of replicating the first message in the first instance of the message queue at the first node to each of the other nodes in the plurality of computing nodes with an indication that the first node is the owner of the first message.

In many embodiments, node 1000 can include a migration request generation module 1003. In several embodiments, migration request generation module 1003 can at least partially perform block 405 (FIG. 4) of determining if the message is older than 2*θ, block 406 (FIG. 4) of include sleeping until the message is older than 2*θ, block 407 (FIG. 4) of determining if the message is still deliverable to the subscriber, block 408 (FIG. 4) of sending a migration request for ownership of the message to the owner of the message, block 409 (FIG. 4) of putting the instant node into a "waiting for ownership" state, and/or block 410 (FIG. 4) of determining whether the state of ownership of the message has changed or the wait for ownership has exceeded 2*θ.

In a number of embodiments, node 1000 can include a migration request receipt module 1004. In several embodiments, migration request receipt module 1004 can at least partially perform block 501 (FIG. 5) of receiving a migrate message request, and/or block 802 (FIG. 8) of receiving, at a first node of a plurality of computing nodes, a message ownership migration request for a first message.

In many embodiments, node 1000 can include a migration action generation module 1005. In several embodiments, migration action generation module 1005 can at least partially perform block 504 (FIG. 5) of recording the new owner in a transaction log and sending a migration action message to each of the other nodes, block 803 (FIG. 8) of designating the second node as a new owner of the first message, and/or block 804 (FIG. 8) of sending a message ownership migration notification for the first message from the first node to each of the other nodes of the plurality of computing nodes.

In a number of embodiments, node 1000 can include a migration action receipt module 1006. In several embodiments, migration action receipt module 1006 can at least partially perform block 601 (FIG. 6) of receiving a migrate message action indicating that ownership of a message is being changed, block 602 (FIG. 6) of recording the new owner of the message in the transaction log of the instant node, block 603 (FIG. 6) of determining if the instant node is the new owner specified in the migrate message action, block 805 (FIG. 8) of receiving, at the second node, the message ownership migration notification for the first message, and/or block 903 (FIG. 9) of receiving, at the first node, a prior message ownership notification that transferred ownership of the first message to the first node from a third node of the plurality of computing nodes.

In many embodiments, node 1000 can include a migration action generation module 1005. In several embodiments, migration action generation module 1005 can at least partially perform block 701 (FIG. 7) of receiving an acknowledgement message, and/or block 702 (FIG. 7) of calculating a new θ for the message queue of the node that is the owner of the message that was delivered.

Figure 12:
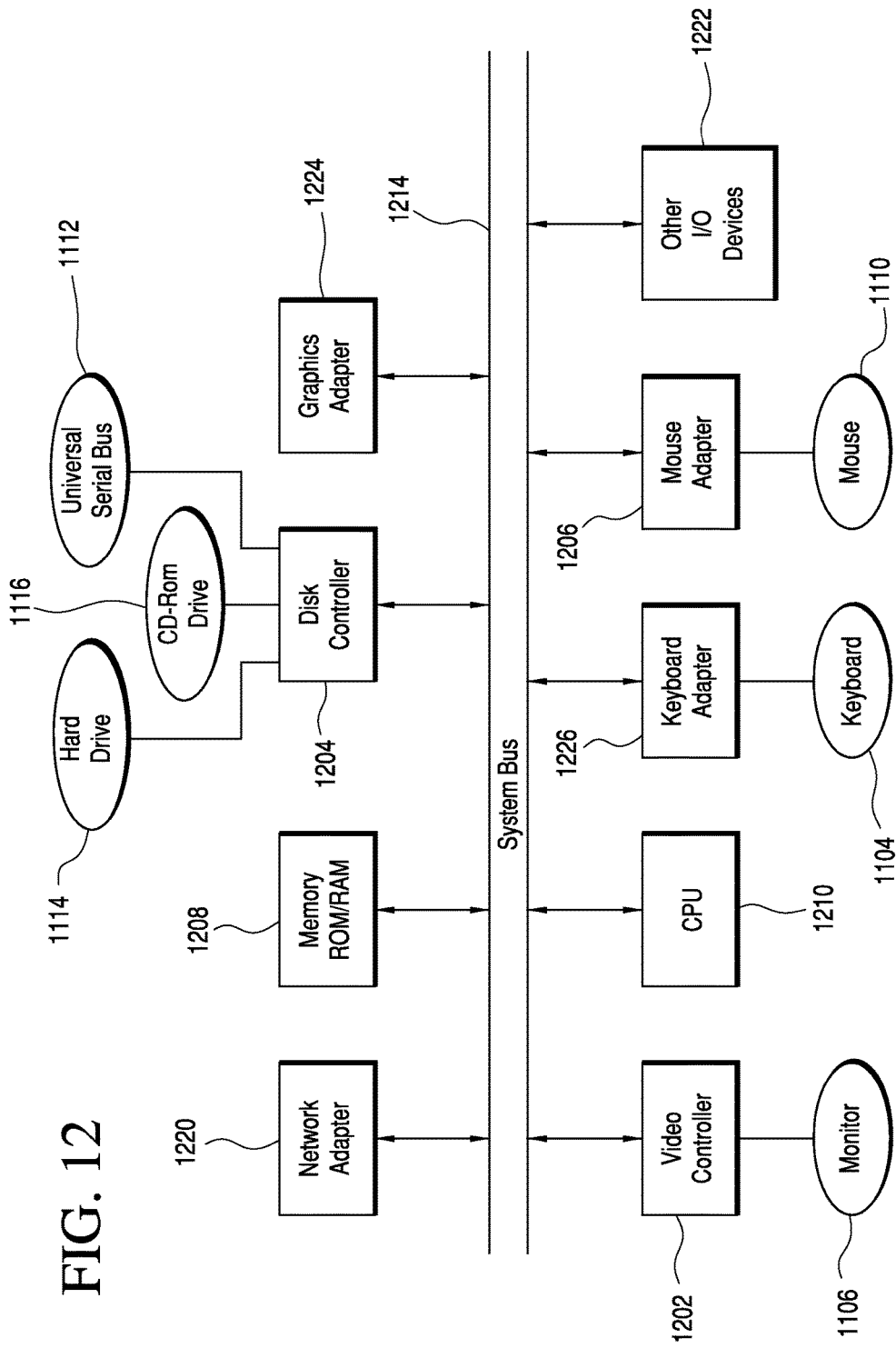
FIG. 12 illustrates a representative block diagram of an example of elements included in circuit boards inside a chassis of the computer of FIG. 11.

Turning ahead in the drawings, FIG. 11 illustrates a computer system 1100, all of which or a portion of which can be suitable for implementing an embodiment of at least a portion of message processing system 110 (FIG. 1), message processing system 210 (FIG. 2), message processing system 310 (FIG. 3), and/or the techniques described in process 400 (FIG. 4), process 500 (FIG. 5), process 600 (FIG. 6), process 700 (FIG. 7), method 800 (FIG. 8), and/or block 801 (FIG. 9). Computer system 1100 includes a chassis 1102 containing one or more circuit boards (not shown), a USB (universal serial bus) port 1112, a Compact Disc Read-Only Memory (CD-ROM) and/or Digital Video Disc (DVD) drive 1116, and a hard drive 1114. A representative block diagram of the elements included on the circuit boards inside chassis 1102 is shown in FIG. 12. A central processing unit (CPU) 1210 in FIG. 12 is coupled to a system bus 1214 in FIG. 12. In various embodiments, the architecture of CPU 1210 can be compliant with any of a variety of commercially distributed architecture families.

Continuing with FIG. 12, system bus 1214 also is coupled to memory 1208 that includes both read only memory (ROM) and random access memory (RAM). Non-volatile portions of memory storage unit 1208 or the ROM can be encoded with a boot code sequence suitable for restoring computer system 1100 (FIG. 11) to a functional state after a system reset. In addition, memory 1208 can include microcode such as a Basic Input-Output System (BIOS). In some examples, the one or more memory storage units of the various embodiments disclosed herein can comprise memory storage unit 1208, a USB-equipped electronic device, such as, an external memory storage unit (not shown) coupled to universal serial bus (USB) port 1112 (FIGS. 11-12), hard drive 1114 (FIGS. 11-12), and/or CD-ROM or DVD drive 1116 (FIGS. 11-12). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise Microsoft® Windows® operating system (OS), Mac® OS, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 1210.

In the depicted embodiment of FIG. 12, various I/O devices such as a disk controller 1204, a graphics adapter 1224, a video controller 1202, a keyboard adapter 1226, a mouse adapter 1206, a network adapter 1220, and other I/O devices 1222 can be coupled to system bus 1214. Keyboard adapter 1226 and mouse adapter 1206 are coupled to a keyboard 604 (FIGS. 11 and 12) and a mouse 1110 (FIGS. 11 and 12), respectively, of computer system 1100 (FIG. 11). While graphics adapter 1224 and video controller 1202 are indicated as distinct units in FIG. 12, video controller 1202 can be integrated into graphics adapter 1224, or vice versa in other embodiments. Video controller 1202 is suitable for refreshing a monitor 1106 (FIGS. 11 and 12) to display images on a screen 1108 (FIG. 11) of computer system 1100 (FIG. 11). Disk controller 1204 can control hard drive 1114 (FIGS. 11 and 12), USB port 1112 (FIGS. 11 and 12), and CD-ROM or DVD drive 1116 (FIGS. 11 and 12). In other embodiments, distinct units can be used to control each of these devices separately.

In some embodiments, network adapter 1220 can comprise and/or be implemented as a WNIC (wireless network interface controller) card (not shown) plugged or coupled to an expansion port (not shown) in computer system 1100 (FIG. 11). In other embodiments, the WNIC card can be a wireless network card built into computer system 1100 (FIG. 11). A wireless network adapter can be built into computer system 1100 (FIG. 11) by having wireless communication capabilities integrated into the motherboard chipset (not shown), or implemented via one or more dedicated wireless communication chips (not shown), connected through a PCI (peripheral component interconnector) or a PCI express bus of computer system 1100 (FIG. 11) or USB port 1112 (FIG. 11). In other embodiments, network adapter 1220 can comprise and/or be implemented as a wired network interface controller card (not shown).

Although many other components of computer system 1100 (FIG. 11) are not shown, such components and their interconnection are well known to those of ordinary skill in the art. Accordingly, further details concerning the construction and composition of computer system 1100 (FIG. 11) and the circuit boards inside chassis 1102 (FIG. 11) need not be discussed herein.

When computer system 1100 in FIG. 11 is running, program instructions stored on a USB drive in USB port 1112, on a CD-ROM or DVD in CD-ROM and/or DVD drive 1116, on hard drive 1114, or in memory 1208 (FIG. 12) are executed by CPU 1210 (FIG. 12). A portion of the program instructions, stored on these devices, can be suitable for carrying out all or at least part of the techniques described herein. In various embodiments, computer system 1100 can be reprogrammed with one or more modules, applications, and/or databases, such as those described herein, to convert a general purpose computer to a special purpose computer.

Although computer system 1100 is illustrated as a desktop computer in FIG. 11, there can be examples where computer system 1100 may take a different form factor while still having functional elements similar to those described for computer system 1100. In some embodiments, computer system 1100 may comprise a single computer, a single server, or a cluster or collection of computers or servers, or a cloud of computers or servers. Typically, a cluster or collection of servers can be used when the demand on computer system 1100 exceeds the reasonable capability of a single server or computer. In certain embodiments, computer system 1100 may comprise a portable computer, such as a laptop computer. In certain other embodiments, computer system 1100 may comprise a mobile device, such as a smartphone. In certain additional embodiments, computer system 1100 may comprise an embedded system.

Although the disclosure has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that any element of FIGS. 1-12 may be modified, and that the foregoing discussion of certain of these embodiments does not necessarily represent a complete description of all possible embodiments. For example, one or more of the procedures, processes, or activities of FIGS. 4-9 may include different procedures, processes, and/or activities and be performed by many different modules, in many different orders, and/or one or more of the procedures, processes, or activities of FIGS. 4-9 may include one or more of the procedures, processes, or activities of another different one of FIGS. 4-9.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   a plurality of computing nodes each comprising one or more processing modules and one or more non-transitory storage modules storing computing instructions configured to run on the one or more processing modules;
   a first node of the plurality of computing nodes, the first node comprising a first instance of a message queue; and
   a second node of the plurality of computing nodes, the second node comprising a second instance of the message queue,
   wherein the computing instructions of the first node are configured, when run on the one or more processing modules of the first node, to perform:
      after a first message in the first instance of the message queue at the first node has been replicated across the plurality of computing nodes, receiving a message ownership migration request for the first message, the message ownership migration request originating from the second node of the plurality of computing nodes, the first node being an owner of the first message in the first instance of the message queue at the first node, only one of the plurality of computing nodes being the owner of the first message at a given time, the owner of the first message being the only one of the plurality of computing nodes that can deliver the first message at the given time, the first message being published from a first publisher to the message queue at one node of the plurality of computing nodes, the first message in the first instance of the message queue at the first node having been replicated at the second instance of the message queue at the second node, and a first subscriber being subscribed to the second instance of the message queue at the second node;
      after receiving the message ownership migration request for the first message, designating the second node as a new owner of the first message such that the first node is no longer the owner of the first message; and
      sending a message ownership migration notification for the first message from the first node to other computing nodes of the plurality of computing nodes, the message ownership migration notification identifying the second node as the new owner of the first message.

2. The system of claim 1, wherein the computing instructions of the second node are configured, when run on the one or more processing modules of the second node, to perform:
   receiving the message ownership migration notification for the first message; and
   after receiving the message ownership migration notification for the first message, sending the first message to the first subscriber from the second instance of the message queue.

3. The system of claim 1, wherein:
   the computing instructions of the first node are further configured, when run on the one or more processing modules of the first node, to perform, before receiving the message ownership migration request, receiving the first message in the first instance of the message queue from the first publisher; and
   the computing instructions of each node of the plurality of computing nodes are further configured, when run on the one or more processing modules of the node, to collectively perform, before receiving the message ownership migration request, replicating the first message in the first instance of the message queue at the first node to each of the other computing nodes of the plurality of computing nodes with an indication that the first node is the owner of the first message,
   wherein:
      the first node is an initial owner of the first message.

4. The system of claim 3, wherein:
   replicating the first message in the first instance of the message queue at the first node to each of the other computing nodes further comprises sending a replication path that indicates at each receiving node of the other computing nodes a forwarding order of nodes of the plurality of computing nodes from the first node to the receiving node.

5. The system of claim 1, wherein the computing instructions of the first node are further configured, when run on the one or more processing modules of the first node, to perform, before receiving the message ownership migration request:
   receiving a prior message ownership notification transferring ownership of the first message to the first node from a third node of the plurality of computing nodes.

6. The system of claim 1, wherein:
   the second node sends the message ownership migration request to the first node when the first message in the second instance of the message queue is deliverable to the first subscriber from the second node and the first node has been the owner of the first message for longer than a first threshold.

7. The system of claim 6, wherein:
   the first threshold is based at least in part on an average time for the first node to receive an acknowledgement of completion from one or more second subscribers that are subscribed to the first node for messages delivered from the first instance of the message queue to the one or more second subscribers.

8. The system of claim 1, wherein:
   designating the second node as the new owner of the first message comprises designating the second node as the new owner of the first message when one or more of:
   (a) there is no subscriber subscribed to the first instance of the message queue at the first node,
   (b) the first message is not deliverable to a subscriber subscribed to the first instance of the message queue at the first node, or
   (c) a lease is broken for the first message sent from the first node to the subscriber subscribed to the first instance of the message queue at the first node.

9. The system of claim 1, wherein:
   the second node sends the message ownership migration request to the first node through a fourth node of the plurality of computing nodes along a replication path of the plurality of computing nodes.

10. The system of claim 1, wherein:
the first message in the first instance of the message queue in the first node is identical to a second message in a first instance of a second message queue in the first node; and
the first message is stored in the first instance of the message queue and the second message is stored in the first instance of the second message queue as references to a message in an underlying queue.

11. A method comprising:
receiving, at a first node of a plurality of computing nodes, after a first message in a first instance of a message queue at the first node has been replicated across the plurality of computing nodes, a message ownership migration request for the first message, the message ownership migration request originating from a second node of the plurality of computing nodes, the first node being an owner of the first message in the first instance of the message queue at the first node, only one of the plurality of computing nodes being the owner of the first message at a given time, the owner of the first message being the only one of the plurality of computing nodes that can deliver the first message at the given time, the first message being published from a first publisher to the message queue at one node of the plurality of computing nodes, the first message in the first instance of the message queue at the first node having been replicated at a second instance of the message queue at the second node, and a first subscriber being subscribed to the second instance of the message queue at the second node;
after receiving the message ownership migration request for the first message, designating the second node as a new owner of the first message such that the first node is no longer the owner of the first message; and
sending a message ownership migration notification for the first message from the first node to other computing nodes of the plurality of computing nodes, the message ownership migration notification identifying the second node as the new owner of the first message.

12. The method of claim 11, further comprising:
receiving, at the second node, the message ownership migration notification for the first message; and
after receiving the message ownership migration notification for the first message, sending the first message to the first subscriber from the second instance of the message queue at the second node.

13. The method of claim 11, further comprising, before receiving the message ownership migration request:
receiving, at the first node, the first message in the first instance of the message queue from the first publisher; and
replicating the first message in the first instance of the message queue at the first node to each of the other computing nodes of the plurality of computing nodes with an indication that the first node is the owner of the first message,
wherein:
the first node is an initial owner of the first message.

14. The method of claim 13, wherein:
replicating the first message in the first instance of the message queue at the first node to each of the other computing nodes further comprises sending a replication path that indicates at each receiving node of the other computing nodes a forwarding order of nodes of the plurality of computing nodes from the first node to the receiving node.

15. The method of claim 11, further comprising, before receiving the message ownership migration request:
receiving, at the first node, a prior message ownership notification that transferred ownership of the first message to the first node from a third node of the plurality of computing nodes.

16. The method of claim 11, wherein:
the second node sends the message ownership migration request to the first node when the first message in the second instance of the message queue is deliverable to the first subscriber from the second node and the first node has been the owner of the first message for longer than a first threshold.

17. The method of claim 16, wherein:
the first threshold is based at least in part on an average time for the first node to receive an acknowledgement of completion from one or more second subscribers that are subscribed to the first node for messages delivered from the first instance of the message queue to the one or more second subscribers.

18. The method of claim 11, wherein:
designating the second node as the new owner of the first message comprises designating the second node as the new owner of the first message when one or more of:
(a) there is no subscriber subscribed to the first instance of the message queue at the first node,
(b) the first message is not deliverable to a subscriber subscribed to the first instance of the message queue at the first node, or
(c) a lease is broken for the first message sent from the first node to the subscriber subscribed to the first instance of the message queue at the first node.

19. The method of claim 11, wherein:
the second node sends the message ownership migration request to the first node through a fourth node of the plurality of computing nodes along a replication path of the plurality of computing nodes.

20. The method of claim 11, wherein:
the first message in the first instance of the message queue at the first node is identical to a second message in a first instance of a second message queue at the first node; and
the first message is stored in the first instance of the message queue and the second message is stored in the first instance of the second message queue as references to a message in an underlying queue.

* * * * *